United States Patent
Harchol-Balter et al.

(10) Patent No.: US 6,223,205 B1
(45) Date of Patent: Apr. 24, 2001

(54) METHOD AND APPARATUS FOR ASSIGNING TASKS IN A DISTRIBUTED SERVER SYSTEM

(76) Inventors: Mor Harchol-Balter, 47 Market St. #2, Cambridge, MA (US) 02139; Mark E. Crovella, 14 Collier Rd., Scituate, MA (US) 02066

( * ) Notice: Subject to any disclaimer, the term of this patent is extended or adjusted under 35 U.S.C. 154(b) by 0 days.

(21) Appl. No.: 09/023,893

(22) Filed: Feb. 13, 1998

Related U.S. Application Data (60) Provisional application No. 60/063,484, filed on Oct. 20, 1997.

(51) Int. Cl.$^7$ ........................................................ G06F 9/00
(52) U.S. Cl. ................................................ 709/105; 709/102
(58) Field of Search ........................................ 709/312, 203, 709/102, 105, 100, 101, 103, 104

(56) References Cited

U.S. PATENT DOCUMENTS

| | | | |
|---|---|---|---|
| 5,088,032 | 2/1992 | Bosack | 395/200 |
| 5,539,883 | 7/1996 | Allon et al. | 395/200.11 |
| 5,548,724 | * 8/1996 | Akizawa et al. | 709/203 |
| 5,617,570 | * 4/1997 | Russell et al. | 709/312 |
| 5,644,720 | * 7/1997 | Boll et al. | 709/227 |

OTHER PUBLICATIONS

Almeida, J. et al., "Measuring the behavior of a World–Wide Web server," Seventh Conference on High Performance Networking (HPN), pp. 57–72, White Plains, NY, Apr., 1997. IFIP.

Almeida, V. et al., "Performance analysis of a WWW server," Proceedings of CMG "95, 1995.

Anderson et al., The magicrouter: An application of fast packet interposing. Technical report, UC Berkeley, 1996.

Arlitt et al., Web server workload characterization: The search for invariants. Proceedings of the 1996 SIGMETRICS Conference on Measurement and Modeling of Computer Systems, pp. 126–137, 1996.

Boyle, P., Web site traffic cops: Load balancers can provide the busiest web sites with non–stop performance. *PC Magazine*. Available online at http://8.zdnet.com/pcmag/, Feb. 18, 1997.

(List continued on next page.)

*Primary Examiner*—Majid A. Banankhah (57) ABSTRACT

A distributed server system is disclosed which includes a load balancer and a plurality of host processors. The load balancer receives requests for service and distributes task assignments among the plurality of processors based upon the amount of work associated with the respective requests for service. More specifically, each host processor services requests for service within a predefined task size interval and the load balancer assigns to each host processor only those requests for service which involve task sizes within the particular task size interval associated with the respective processor. In the foregoing manner, the variability of the task sizes assigned to any given host processor is minimized and performance of the distributed server system is improved. In one embodiment of the invention, the thresholds defining the task size intervals served by respective host processors are selected using the task size distribution so as to attempt to allocate substantially the same amount of work to each of the host processors. In another embodiment of the invention, the thresholds defining the task size intervals served by the respective host processors are selected so as to intentionally vary the amount of work performed by the respective processors. This embodiment of the invention is intended to service requests for service in the nature of heavy tailed distributions. Task size interval assignments are skewed such that requests for service corresponding to smaller tasks are serviced by a host processor which is more lightly loaded than other processors. In this manner, mean slowdown metrics are improved.

39 Claims, 6 Drawing Sheets

OTHER PUBLICATIONS

Brisco, T., DNS support for load balancing. RFC 1794, USC/Information Sciences Institute. Available at ftp://ds.internic.net/rfc/rfc1794.txt., Apr. 1995.

Colajanni, M. et al., "Scheduling algorithms for distributed web servers," Proceedings of ICDCS '97, 1997.

Crovella, M. et al., Self-similarity in World Wide Web traffic: Evidence and possible causes. Proceedings of the 1996 ACM SIGMETRICS International Conference on Measurement and Modeling of Computer Systems, pp. 160–169, May 1996.

Crovella, M. et al., Heavy–Tailed probability Distributions in the world wide web. *A Practical Guide to Heavy Tails,* chapter 1, pp. 1–23, Chapman & Hall, New York, 1997.

Crovella, M. et al., "Long–Lasting transient conditions in simulations with heavy–tailed workloads".

Cunha, C. et al., Characteristics of WWW client–based traces. Technical Report TR–95–010, Boston University Department of Computer Science, Apr. 1995.

Dias, D. et al., A scalable and highly available Web server. Proceedings of the 41st IEEE Computer Society InternationalConference (COMPCON) '96, pp. 85–92, Feb. 1996.

Eager et al., "Adaptive Load Sharing in Homogeneous Distributed Systems," *IEEE transactions on Software Engineering,* vol. SE–12, No. 5:pp. 662–675, May 1986.

Feldmann, A. et al., "Fitting Mixtures of Exponentials to Long–Tail Distributions to analyze Network Performance Models," AT&T Research, Jun. 21, 1996.

Garfinkel, S., "The wizard of Netscape," *Webserver Magazine,* 1(2):59–63, 1996.

Hunt, G. et al., Enabling content–based load distribution for scalable services, Preprint, 1997.

Irlam, G., Unix file size survey—1993. Available at http://www.base.com/gordoni/ufs93.html, Sep. 1994.

Katz E. et al., "A Scalable HTTP Server: The NCSA Prototype," Proceedings of the First International WWW Conference, 1994.

Kleinrock L., "The Round–Robin Scheduling Algorithm," Queuing Systems, vol II, Computer Applications, John Wiley & Sons, pp. 166–170, 1976.

Krueger, P. et al., A comparison of preemptive and non–preemptive load distributing. In 8th International Conference on Distributed Computing Systems, pp. 123–130, Jun. 1988.

Lampson, B., "Hints for computer system design," Proceedings of the Ninth SOSP, in Operating Systems Review, 17(5):33–48, Oct. 1983.

Law, K. et al., "A scalable and distributed WWW proxy system", Proceedings of ACM Multimedia '97, 1997.

Leland, W. et al., "Load–balancing heuristics and process behavior", Proceedings of Performance and ACM Sigmetrics, pp. 54–69, 1986.

Liu, Y. et al., A distributed Web server and its performance analysis on multiple platforms. Proceedings of the 16th International Conference on Distributed Computing Systems (ICDCS), pp. 665–672, 1996.

Mogul, J. et al., Network behavior of a busy web server and its clients. Technical report, *DEC WRL Research Report 95/5,* Oct. 1995.

Mourad, A. et al,. Redirection–based scalable web server architecture. Preprint, 1997.

Mosedale, D. et al., "Administering very high volume internet services". Available at http://www.keynote.com/techrpts/nspaper.html.

Mosedale, D. et al., "Lessons learned adminstering netscape's internet site", *Internet Computing,* 1(2):28–35, 1997.

Nagy, S. et al., "Concurrently admission control for RT Databases".

Pang, H. et al., "Managing Memory for real–time queries", 1994.

Paxson, V. et al., Wide–area traffic: The failure of poisson modeling. *IEEE/ACM Transactions on Networking,* pp. 226–244, Jun. 1995.

Peterson, D. et al., Data center I/O patterns and power laws. CMG Proceedings, Dec. 1996.

Stadelman, M. et al., "UNIX web server performance analysis", Proceedings of CMG '95, 1995.

Willekens, E. et al., "Asymptotic expansions for waiting time probabilities in an M/G/1 queue with long–tailed service times", *Queueing Systems,* 10:295–312, 1992.

Yerxa, G., "Web server redirectors balance your web load", Network Computing—CMPnet. Available online at http://techweb.cmp.com/nc/814/814cn2.html, Jul. 31, 1997.

* cited by examiner

METHOD AND APPARATUS FOR ASSIGNING TASKS IN A DISTRIBUTED SERVER SYSTEM

CROSS REFERENCE TO RELATED APPLICATIONS

The present application claims priority of U.S. Provisional Patent Application No. 60/063,484, titled TASK LOAD BALANCING AMONG MULTIPLE SERVERS IN A COMPUTER NETWORK and filed Oct. 20, 1997.

STATEMENT REGARDING FEDERALLY SPONSORED RESEARCH OR DEVELOPMENT

The presently disclosed subject matter has been funded, at least in part, by the United States Government. Accordingly, the U.S. Government may have certain rights in the invention.

BACKGROUND OF THE INVENTION

The present invention relates to a distributed computer server system comprising a load balancer and a plurality of host processors and more particularly to a method and apparatus for dividing requests for service among the various host processors comprising the distributed server.

Many applications exist in which requests for service are received at a computer system and the computer system needs to service the requests in a prompt manner. Such is particularly true of interactive systems such as web servers in which a user initiates a hypertext transport protocol (http) request for service and awaits the receipt of a response, typically in the form of a downloaded web page. If the time for service is too long, the users may become frustrated and disinclined to use the web site. The same holds true more generally for any application where a computer system processes user requests. For example, the computer system might be a database server which processes database queries for users, or, more generally, the computer system might simply be a powerful computer to which users send their programs for execution.

When the demand for service exceeds the ability of a host processor to service the demand, the site administrator is faced with several options. The administrator can replace the current host processor with a faster host processor or add additional host processors to create a distributed server. Given the availability of high performance low cost processors, the use of multiple processors is an option typically chosen to satisfy increasing demands for service due to the scalability of this approach.

Once a decision has been made to utilize multiple host processors in a distributed server arrangement, policy decisions must be made as to how to assign the requests for service to the respective host processors. Such policy decisions are often referred to as the task assignment policy. The assignment of requests to the respective host processors in a distributed server system is performed by a processor known as a load balancer which receives a demand for service and based on some predetermined policy, forwards the request to one of the host processors within the distributed server system.

The load balancers known in the art typically distribute requests for service in a round robin basis or forward the request for service to the host processor with the shortest queue length. Some load balancers employ dynamic proprietary assignment techniques which are understood to forward requests for service based upon feedback obtained from the respective hosts.

The effectiveness of a task assignment policy is measured in terms of performance metrics like mean waiting time (the average waiting time over all tasks). Most task assignment policies perform well when the variability among the task sizes being serviced is not too great. When there is a large variability among the task sizes being serviced, most task assignment policies experience a severe decline in performance.

Studies of requests for service from web servers have shown that such are generally in the nature of a heavy tailed distribution in which there are a far greater number of small jobs or small requests than large jobs or large requests. A heavy tailed distribution is one whose tail declines like a power law, that is, $P[X>x] \sim x^{-\alpha}$ for $0<\alpha\_[23]2$. Such a task size distribution shows extremely high variability among the task sizes between the small jobs and the large jobs. Studies of requests for service in other application areas have also shown a heavy-tailed distribution (with extremely high variability). Examples include, for example, the processing time for Unix tasks.

Another policy decision, which is related to the task assignment policy, is the queueing policy at the host processors. Once the load balancer assigns tasks to a host for processing (via the task assignment policy), that host then processes (services) those tasks in some order.

In the prior art, all the host processors use the same service order. Typically this service order is one of the following three: (1) First-Come-First-Served (FCFS), where jobs are serviced in the order in which they are queued at the host (i.e. in the order of their arrival to the host). Once a task begins receiving service, its service is not interrupted until the task completes. (2) Time-Sharing (also known as Processor-Sharing (PS)), where each job at the host is serviced for a small predetermined period of time and then the processor goes through a context switch and another job is serviced for a small period of time. That is, the host processes a job in a time multiplexed basis with other pending requests. (3) Admission Control, where the host only time-shares among the first m tasks at the head of the queue, where m is the optimal multiprogramming level for the host. The rest of the tasks are simply queued in the order in which they arrive. When one of these m tasks complete, the very next task in the queue is chosen to replace it. The advantage of FCFS service order over time-sharing is its simplicity of implementation. In many applications the context switch cost can be prohibitive, or simply impractical, and thus FCFS service order is used. PS service order, on the other hand, has the advantage that small jobs receive service quickly, even if they arrive subsequent to a large job seeking service. Admission Control is more similar to FCFS, since it predominantly is a queueing service order. Host processors are referred to herein as being run in FCFS mode, Admission Control mode, or time-sharing mode, when referring to the service order of jobs at the host.

It would be desirable to provide a load balancing technique which efficiently services requests notwithstanding high variability in task sizes.

BRIEF SUMMARY OF THE INVENTION

In accordance with the present invention a distributed server system is disclosed which includes a load balancer and a plurality of host processors. The load balancer receives requests for service and distributes task assignments among the plurality of processors based upon the amount of work associated with the respective requests for service. More specifically, each host processor services requests for service within a predefined task size interval and the load balancer assigns to each host processor only those requests for service which involve task sizes within the particular task size interval associated with the respective processor. In the foregoing manner, the variability of the task sizes assigned to any given host processor is minimized and performance of the distributed server system is improved. In one embodiment of the invention, the thresholds defining the task size intervals served by respective host processors are selected to attempt to allocate substantially the same amount of work to each of the host processors. In this embodiment, the service order at each host processor is determined using a specified criterion, and it will sometimes turn out that the service order is not the same at all of the host processors, with some hosts operating in time-sharing mode and others operating in queueing mode. In another embodiment of the invention, the thresholds defining the task size intervals served by the respective host processors are selected to intentionally vary the amount of work performed by the respective processors to achieve improved slowdown metrics.

BRIEF DESCRIPTION OF THE SEVERAL VIEWS OF THE DRAWING

The present invention will be more fully understood by reference to the following Detailed Description of the Invention in conjunction with the drawing of which.

DETAILED DESCRIPTION OF THE INVENTION

U.S. Provisional Application No. 60/063,484, titled Task Load Balancing Among Multiple Servers in a Computer Network and filed Oct. 20, 1997, is hereby incorporated by reference.

Figure 3:
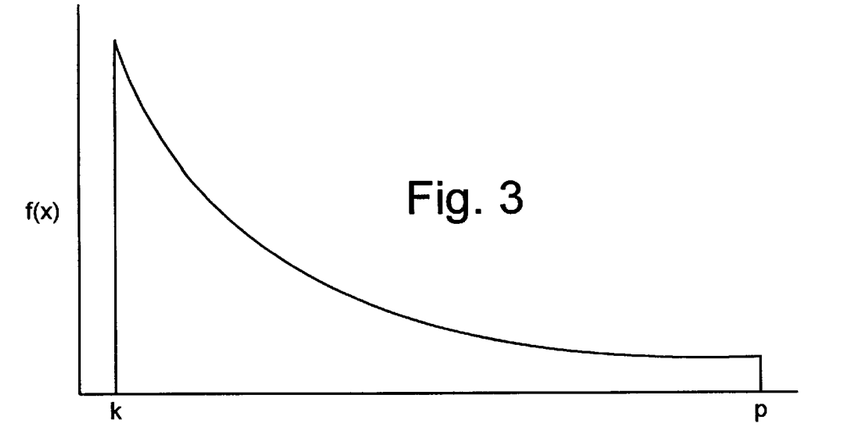
FIG. 3 is a graphical representation of a probability distribution for requests for service (tasks) of size k through p in the form of a bounded heavy tailed distribution.

For purposes of illustration, the present discussion will initially focus on the example of a Web server application. Recent measurements of web file sizes requested from web servers have indicated that the file size requests are in the nature of a heavy tailed distribution, as depicted in FIG. 3, and in particular, evidence high variability in the size of the files requested from the server. High-variance, heavy tailed distributions have also been measured in a wide range of computer workloads. A method and apparatus are presently disclosed for efficiently servicing requests for service in the circumstance where the work to be performed in response to the requests may be highly variable and the amount of work to be performed in response to a request is generally ascertainable upon receipt of the request.

Figure 1:
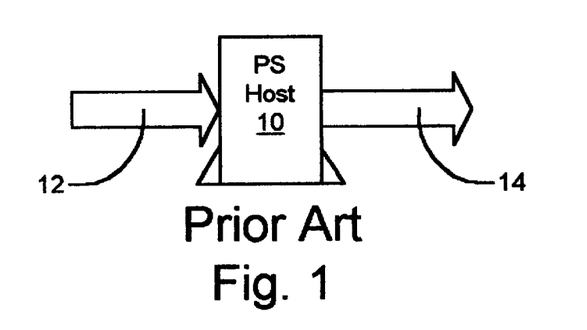
FIG. 1 is a diagrammatic illustration of a single prior art host processor operating as processor sharing (time slicing) host.
Figure 2:
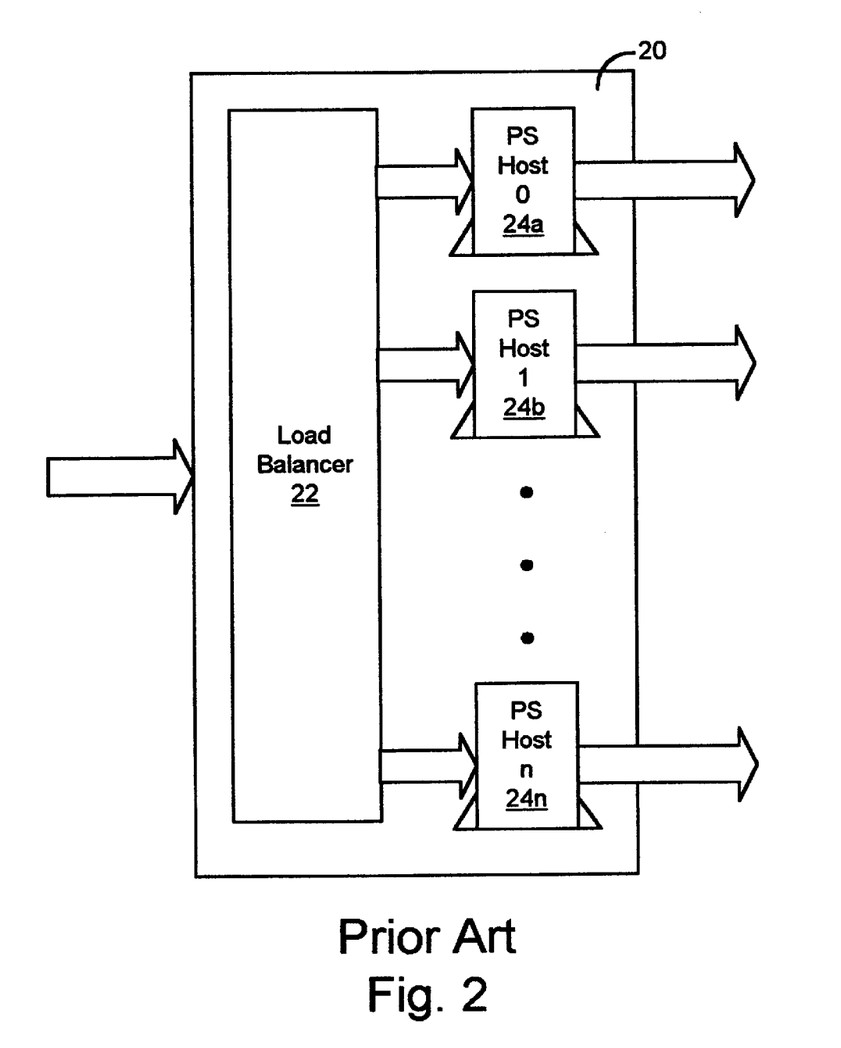
FIG. 2 is a simplified block diagram of a prior art distributed server comprising a load balancer and a plurality of host processors operating in a processor sharing manner for servicing requests directed to the respective hosts by load balancer.

FIGS. 1 and 2 are illustrative of simplified prior art Web Servers. FIG. 1 illustrates a prior art Web Server or host processor 10 which typically receives hypertext message language (html) requests 12, and in response, accesses a file and provides an output 14 in the form of data representative of a web page for transmittal to a user. The host processor, upon receipt of the html request, processes the request according to some service order. In the Web application, the service order at the host processor is typically time-sharing. However in other applications, the service order at all the host processors might be some form of queueing discipline, such as FCFS or Admission Control. As discussed above, once the service demands on the Web Server 10 exceed the capacity of the single host processor 10, Web Server administrators have typically opted for distributed Web Servers 20 such as depicted in FIG. 2. In the case of a Web Server all host processors are typically operated in time-sharing (PS) mode, as illustrated. However, in other applications, all host processors might be operated in a FCFS, or Admission Control mode. As illustrated, a typical prior art Web Server 20 employs a load balancer 22, which receives html requests for service. The load balancer 22 serves to distribute the requests for service among a plurality of hosts 24a, 24b, . . . , 24n. Various scheduling algorithms have been employed within load balancers historically to direct requests for service to the respective hosts. Three such techniques are referred to herein as round robin scheduling, random scheduling and dynamic scheduling.

The most commonly used task scheduling mechanism in current distributed Web Servers employs a feature of the Domain Name System (DNS) called round robin DNS. The round robin approach attempts to balance the load among the participating hosts by equalizing the number of tasks assigned to each host. This equalization is accomplished by simply assigning each received request for service to the next host in a predetermined sequence. The time scale at which the round robin DNS approach balances load, however, is relatively coarse and can lead to significant load imbalance in practice.

The TCP router has been developed to provide a finer grained load balancing mechanism than was afforded by the round robin DNS approach. The TCP router modifies the destination IP address within each packet in such a way that all packets stemming from one request go to the same host, but successive requests are mapped to successive hosts in a round robin fashion. This technique allows work to be more equally distributed among the various hosts on a finer time scale than was possible with round robin DNS. Though such routers may introduce delays associated with the modification of each packet that flows through them, their benefits in terms of load balancing are such that they are commonly proposed for high performance distributed Web Servers and commercial products are beginning to appear that employ these devices.

Regardless of whether the scheduling approach is round robin DNS or the TCP router, presently known methods for equalizing load among a plurality of processors rely upon the equalization of the number of tasks assigned to the various processors. Due to the high variability in the size of jobs which result from html requests in a Web Server environment, and the random nature of such requests, both of these approaches produce less than optimum results in terms of actual work assignments among the hosts and the delays observed by the users.

In an attempt to overcome problems associated with the above referenced load balancing techniques, some techniques have been proposed in the past based upon feedback obtained from the various hosts regarding the current load on the respective hosts. Based upon the information obtained from each of the hosts, the load balancer dispatches a request to the least loaded host. This approach requires significant information collection and transfer from the host processors to the load balancer, which can be time consuming and can pose impediments to the system scaling. Furthermore, complexities may be introduced due to staleness of information upon which the load balancer makes dispatch decisions, unless significant bandwidth is allocated to maintain current information on the loading of the respective host processors.

Figure 4:
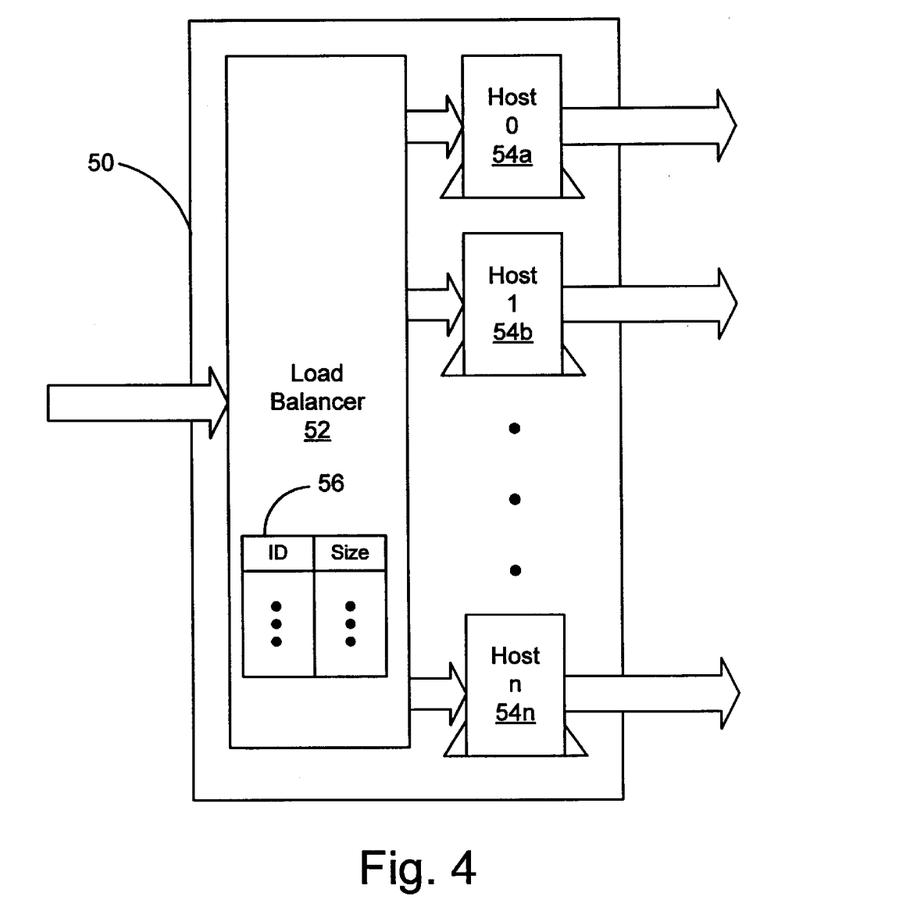
FIG. 4 is a block diagram illustrating a web server operative in accordance with the present invention.

In accordance with the present invention, a distributed server Web Server is disclosed which employs an improved task scheduling mechanism. Referring to FIG. 4, the Web Server 50 includes a load balancer 52 and a plurality of host processors such as host processors 0, 1, . . . n identified herein as processors 54a, 54b . . . 54n, respectively. Each of the hosts 54a . . . 54n services requests for service of a specified size interval.

More specifically, the Load Balancer 52 maintains a table 56 within a memory which includes an identification of all files accessible by the web server 50 along with the size of the respective file or a metric which is representative of the amount of work involved in responding to the respective service request. Typically, in a web server environment, the size of the requested file is a suitable metric although any other suitable metric can be employed which allows the association of the amount of work to a given service request upon receipt of the request may be employed. Upon receipt of a service request, the load balancer 52 locates the file identifier within the table 56 and determines the size of the file (or the metric specifying the amount of work to service the file) from the table 56. The Load Balancer 52 then directs the request to the one of the plurality of host processors 54a . . . 54n which services requests for files within the specified file size interval. In this manner, the file size variability observed by any one of the host processors is reduced. It is noted that table 56 does not necessarily need to be maintained within the load balancer 52. The file size corresponding to a request for service may be obtained from the respective host processor or disk system at which the file is stored. In fact, the entire function of the load balancer might be performed by one or more of the host processors.

Each of the host processors may include a dedicated disk system containing the files solely for use by the respective host processor along with the size of the respective files. Alternatively, the respective host processors may share a common disk system which contains all of the files along with an indication of the size of each of the files.

As an alternative to the maintenance of table 56 the request size (the work involved in responding to the request) can be deduced, particularly in the context of other applications. For example, in some applications, the task size may be embedded in the task itself. Additionally, the task might be a program and a user may provide an approximation of the program's processing requirements. Alternatively, the load balancer may approximate the task size by assessing the nature of the task. Consider for example a database server where the tasks are queries to the database. By parsing the query, the load balancer can estimate the time required to process the query using known estimation techniques. Another possibility is for the load balancer to maintain a history table which it can use to estimate the task size. In the history table, the load balancer records the service requests of all previous task executions, under the task's name and perhaps the client's name. Then when a task arrives at the load balancer, the load balancer uses its name or type to guage its service requests based on previous history. If there is no history available, the load balancer assigns a task task if an objective assignement criterion is available. If there is no objective basis for the task size assignment, the load balancer assigns the task to the first host processor (host 0), since most tasks are sent there anyway (since most tasks are small in size).

Figure 5:
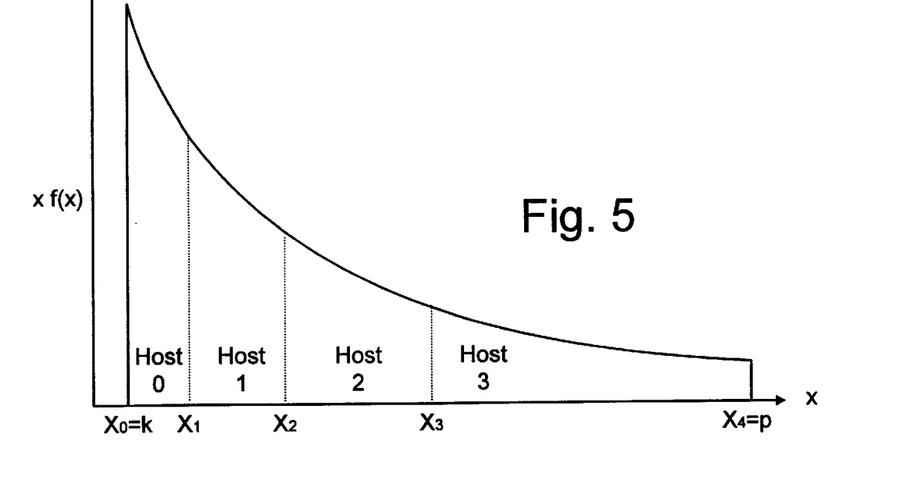
FIG. 5 is a graphical representation illustrating a distribution of tasks divided generally into contiguous regions having equal expected work.

A heavy tailed distribution is illustrated in FIG. 5 in which the work is divided among the various host processors in predetermined intervals based upon task size so as to reduce the variability in the size of the jobs serviced by any one host 54.

In one embodiment of the invention, hereafter known as Size Interval Task Assignment with Equal Load (SITA-E), the intervals are selected in an effort to provide an equal amount of work for each of the processors. More specifically, referring to FIG. 5, all file sizes greater than or equal to $X_0$ but less than or equal to size $X_1$ are serviced by host processor 0, all files of size greater than size $X_1$ but less than or equal to size $X_2$ are serviced by host 1, all files of size greater than size $X_2$ but less than size $X_3$ are serviced by host processor 2 and all files of size greater than $X_3$ but less than or equal to $X_4$ are serviced by host processor 3. Given service requests having a heavy tailed probability distribution there are a far greater number of requests for small files than for large files. Accordingly, as depicted in FIG. 5, the interval size for processor 0 is smaller than the interval size for the other processors.

In SITA-E, using the task size distribution, the cutoff points $X_1$, $X_2$, $X_3$, . . . are derived by equalizing the areas under the curve associated with each interval (see FIG. 5) and solving the resulting simultaneous equations. Though explained in terms of a task size distribution which is heavy tailed, it should be understood that the presently disclosed technique applies to any task size distribution having a finite mean.

Figure 6:
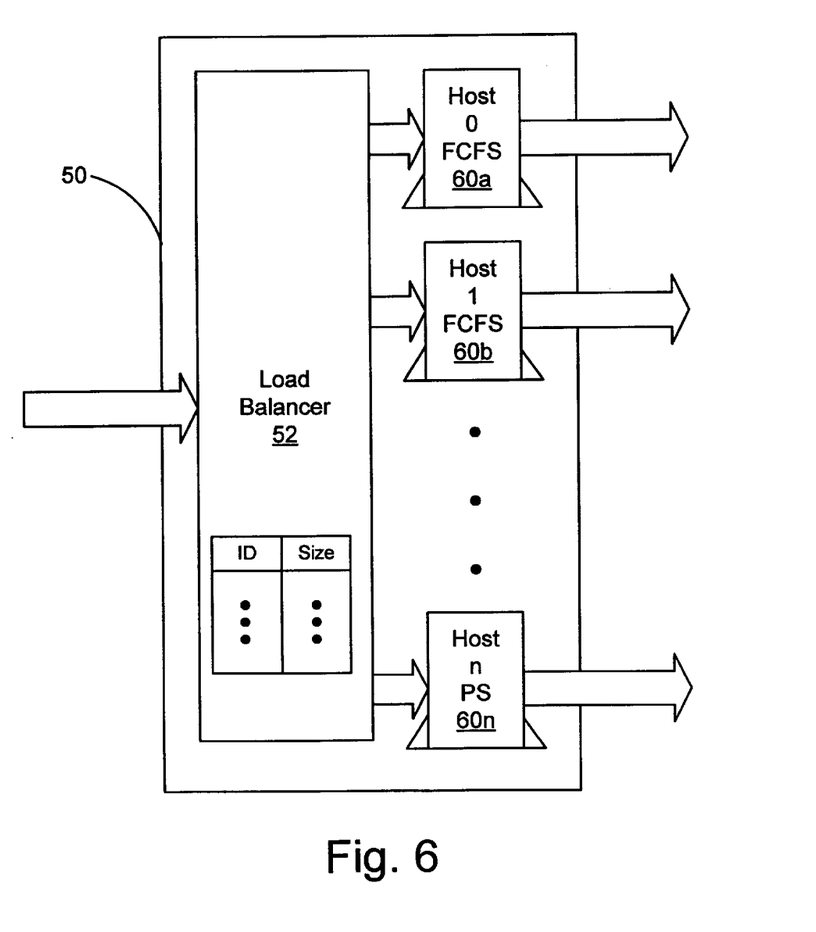
FIG. 6 is a block diagram illustrating the web server of FIG. 4 modified to employ a processor sharing host for at least one of the host processors.

In SITA-E, the host processors 54a . . . 54n do not necessarily all employ the same service order for processing requests, unlike prior load balancers where the host processors all employ the same service order. The queueing order at each host processor is determined independently of the others using the following criterion: Consider the task size distribution as seen by a host processor, and let C denote the coefficient of variation of that distribution. Then if C<1, the host should be run in a queueing mode: i.e. either FCFS mode or alternatively Admission Control mode. Otherwise (if C>1), then time sharing should be used at the host, i.e. the host should be run in processor sharing (PS) mode. The logic behind this criterion is that if the coefficient of variation exceeds 1 then the distribution of task sizes is just variable enough that the host processor would achieve better performance by operating in time sharing (PS) mode, where smaller jobs are less likely to suffer inordinate delays behind large jobs, rather than in a queueing mode. Using the above described criterion, it often turns out that some host processors are operated in FCFS mode, while others are operated in PS mode. Such a scenario is shown in FIG. 6, where some of the host processors $60a \ldots 60_{n-1}$, are operating in the FCFS mode and one or more processors ($60n$ as illustrated operate in the processor sharing mode.

The SITA-E load balancing technique herein described provides significant improvements over the conventional load balancing techniques as measured by mean waiting time and mean slowdown (waiting time of task divided by its service time). The benefits of the SITA-E task assignment approach is apparent even in small scale distributed systems employing four or more host processors. Moreover, the presently described SITA-E task assignment approach does not depend on feedback from the respective host processors, and will, in many cases, outperform servers employing dynamic task assignment policies that must rely on feedback or which attempt to take into account the actual load at each host.

The SITA-E task assignment technique relies upon the assumption that the distribution of the incoming requests is generally known. Such has been demonstrated empirically to be the case for web servers which are called upon to service html requests.

It is recognized that over time, the actual work distribution may not mirror the anticipated work distribution. Accordingly, the Load Balancer 52 can log the incoming service requests to obtain a histogram representative of the actual history of requested file sizes. Based upon the distribution of the histogram, the load balancer 52 may recalculate the task size intervals served by the respective host processors so as to more closely maintain the equal division of work among the host processors or some other desired work distribution as hereinafter discussed. Such dynamic recalculations may be performed periodically, upon experiencing a predetermined amount of service activity or on any other desired event. In this way the SITA-E task assignment policy can adapt to changing workloads. In the case where the task size distribution is not known in advance, history is first collected so as to enable one to approximate the location of the cutoff points.

Finally, though illustrated above with respect to a bounded heavy tailed distribution, it should be appreciated that the SITA-E task assignment technique may be employed with any task size distribution having a finite mean.

Figure 9:
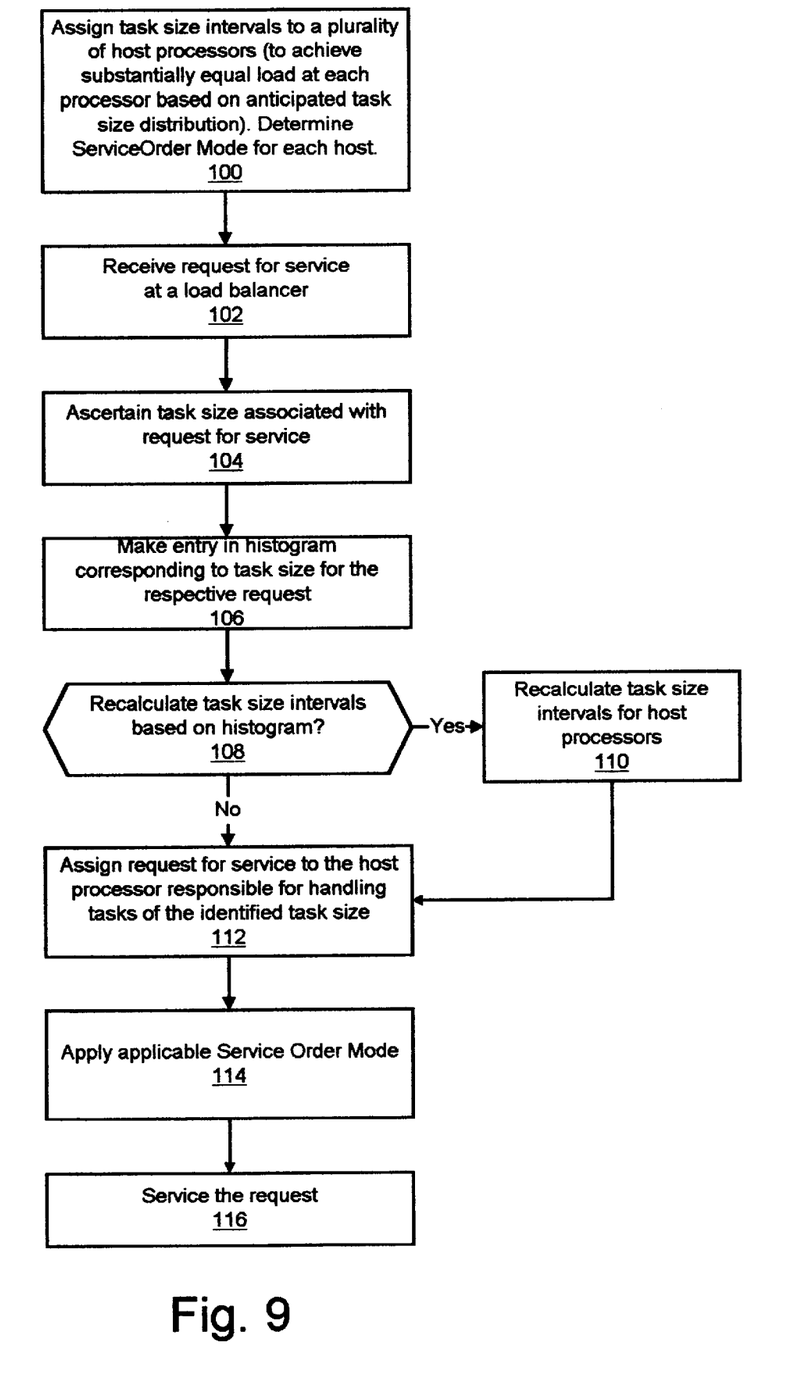
FIG. 9 is a flow diagram illustrating a first load balancing technique in accordance with the present invention.

The method of operation of the SITA-E load balancing technique is further illustrated with reference to the flow diagram of FIG. 9. Referring to FIG. 9, in a first step 100, task size intervals are assigned to a plurality of host processors such that each of the host processors is responsible for servicing tasks of a size within the designated task size interval for the respective processor. At this point in time, for each processor, the coefficient of variation, C, of the task size distribution as seen by that host is calculated. This determines the service order associated with each host (i.e. whether the host will operate in queueing mode or in time-sharing mode). Following the assignment of the task size intervals, as depicted in step 102, a request for service, such as an html request is received. As illustrated in step 104, upon receipt of the request for service, the task size associated with the request for service is ascertained and, as depicted in step 106, a histogram entry is made to facilitate dynamic modification of the task intervals for the respective host processors. In a decision step 108, an inquiry is made as to whether the task size intervals for the respective processors should be recalculated. If this inquiry is answered in the negative, as shown in step 112, the request for service is assigned to the host processor responsible for handling service requests of the task size associated with the respective request for service. As illustrate in step 114, the designated host now either queues the request or time-multiplexes it, depending on the host's service order. As depicted in step 116, the request is serviced as it exits the FCFS queue, such as by responding to the html request by transmitting a web page back to a user requesting such information. The method continues at step 102 as each request for service is received at the load balancer.

In another embodiment of the invention, the goal is not to balance the load across the host processors in the system, but rather to purposely operate some hosts at a lighter load than others. In this embodiment of a distributed server 68, illustrated in FIG. 7, the Load Balancer 70 dispatches requests for service to a plurality of host processors $72a \ldots 72n$ which operate in a processor sharing mode. Typically, conventional load balancers have endeavored to balance the load across all hosts on a system, which has seemed reasonable, since this technique serves to minimize the expected waiting time for tasks in the system. Unlike, conventional load balancers, which endeavor to balance the load among the plurality of host processors, the presently disclosed task assignment technique intentionally unbalances the host processors which operate in a processor sharing mode on a heavily tailed distribution and directs the smaller tasks to the more lightly loaded host processors. This task assignment policy is referred to herein as Size Interval Task Assignment with Variable Load (SITA-V). SITA-V is identical to the SITA-E task assignment policy except that the cutoff points (defining the interval associated with each host) are no longer chosen so as to equalize the work at each host. Also, whereas SITA-E is intended to be used for any task size distribution with finite mean, SITA-V is intended to be used when the task size distribution has the property that the overwhelming majority of tasks are very small yet more than half of the service load is made up by a minority of comparatively large tasks. Heavy tailed distributions (as defined in the Background section) are one class of distributions having this property. Thus we will refer to this property as the heavy-tailed property, although it is not exclusive to heavy tailed distributions.

In servicing such a load distribution, the system performance is judged by user-oriented metrics including mean waiting time and mean slowdown. The waiting time for a task is defined as the time from when the task arrives at the system until the task leaves the system, minus its service time. The mean waiting time is the average task waiting time over all tasks. A task's slowdown is the waiting time divided by its size (which is related to its execution time). That is, the task's waiting time is normalized by its size. Minimizing slowdown is often viewed as the most important performance objective because it results in short tasks waiting the least time and long tasks waiting for longer periods. The presently disclosed SITA-V technique can achieve significant improvements in mean task slowdown. It should be noted however that such improvements come at the expense of increased mean task waiting time. By minimizing slowdown, users can anticipate short delays for short tasks and are more likely to tolerate longer delays for large tasks.

Figure 7:
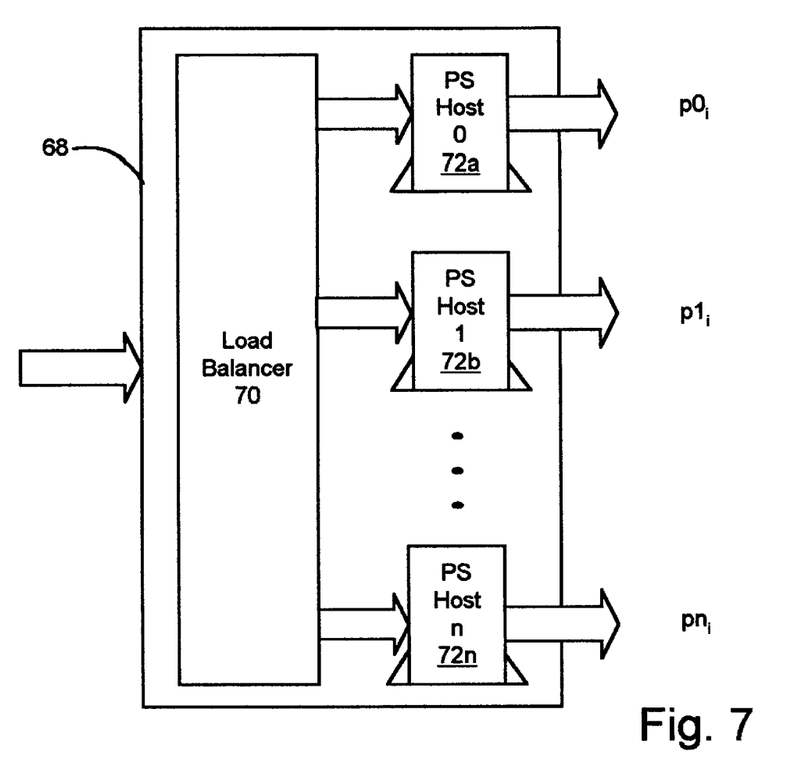
FIG. 7 is a block diagram illustrating a multiple host processor sharing system in which the load of the respective processors is intentionally unbalanced such that the large percentage of smaller jobs run on a host which is more lightly loaded than the host servicing the large jobs.

The forwarding of smaller tasks to more lightly loaded host processors decreases the mean slowdown by significant factors when applied to a work distribution having the heavy-tailed property. Furthermore, the more heavily tailed the distribution, the greater the improvements in mean slowdown that are observed. The SITA-V task assignment technique advantageously requires no feedback from the host processors $72a \ldots 72n$ to the load balancer 70 and is simple to implement.

Consider a distributed server system with processor sharing service order at all the hosts, employing any task assignment policy which balances the expected load among its hosts and directs a Poisson arrival stream to each host. If $\rho$ denotes the system load, then the load at every host is also $\rho$, so the mean slowdown at each host is $\rho/(1-\rho)$ and the mean slowdown for the system is also $\rho/(1-\rho)$. This fact holds independently of the distribution of task size, and also independently of the particular task assignment policy. We will refer to the mean slowdown in this scenario as $E\{S^{EQ}\_{LOAD}\}$.

By unbalancing the loads at the hosts so as to lighten the load at hosts servicing the small jobs, significant performance improvements in mean slowdown are observed in a distributed server servicing requests in the nature of a heavy tailed distribution. The operation of the SITA-V load balancing technique will be more fully understood by reference to FIG. 8 which depicts mean slowdown for first and second hosts in a two host system, given a task size cutoff between a lower bound k and an upper bound p. The point at which $x_1=x_e$ depicts balanced load between the two hosts. This represents a special case of SITA-V in which the load on each of the two hosts is equal.

Figure 8:
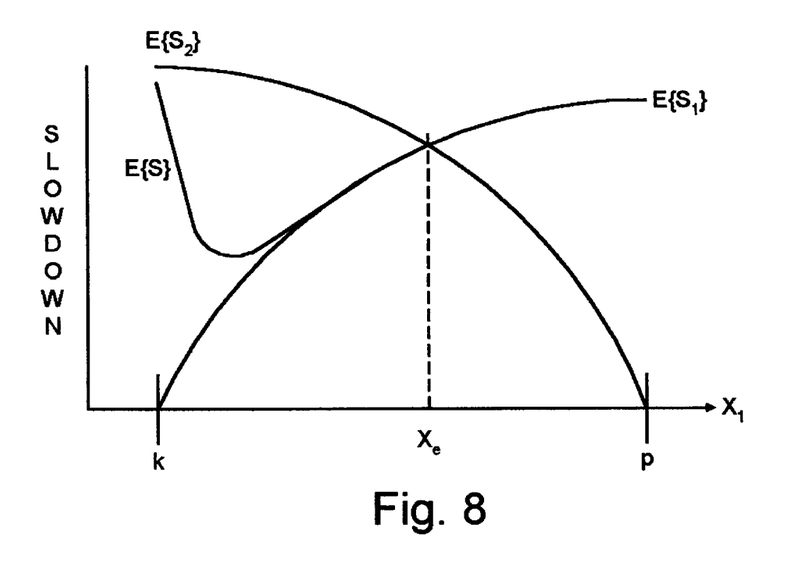
FIG. 8 is a graph illustrating the mean slowdown for two host processors in the load balancing system of FIG. 7 as a function of the task size.

Under SITA-V all tasks of size between k and $x_1$ are assigned to a first host and all tasks of size between $x_1$ and p are directed to a second host. The cutoff $x_1$ is selected so as to minimize the mean slowdown, $E\{S\}$, for the system. It is noted that legal values of $x_1$ are constrained such that the load on both hosts remains below 1.

The mean slowdown may be analyzed for a 2 host system in which tasks of size less than $x_1$ are sent to host 1 and tasks of size greater than x1 are sent to host 2. In such a system let $p_i$ (i=1,2) be the fraction of tasks that are assigned to the respective hosts i and let $S_i$ be the slowdown for tasks assigned to host i. Then the mean slowdown is represented by the equation:

$$E\{S\}=P_1E\{S_1\}+P_2E\{S_2\}$$

where the values of $p_i$ and $E\{S_i\}$ depend on the cutoff point $x_1$. When $x_i=X_e$, $E\{S_1\}=E\{S_2\}$ and $E\{S\}=E\{S^{EQ\_LOAD}\}$.

Consider the $E\{S\}$ curve in FIG. 8, representing mean system slowdown. In a task size distribution with the heavy-tailed property, if $x_1=x_e$, then $p_1$ is very large i.e. approximately 1 and $p_2$ is approximately 0. Furthermore, as we move $x_1$ away from $x_e$ and consider smaller values of $x_1$ ($x_1<x_e$), that relationship is still true, provided $x_1$ doesn't get too small. This explains why the $E\{S\}$ curve hugs the $E\{S_1\}$ curve even as $X_1$ moves away from $X_e$, and this in turn explains a lower value of $E\{S\}$ is achieved by moving the cutoff, $x_1$, away from $x_e$, the balanced load case.

For SITA-V with two hosts, the value of $x_1$ that minimizes the slowdown $E\{S\}$ is the inflection point of the $E\{S\}$ curve; i.e. it is the unique point within the legal region at which $dE\{S\}/dx_1=0$. The value of $E\{S\}$ at the inflection point may be significantly lower than its value at $x_1=x_e$, the balanced load case. The more heavy-tailed the task size distribution, the greater the difference between the value of $E\{S\}$ at the inflection point and $E\{S\}$ at the balanced load point ($x_e$). For example, consider a heavy tailed distribution with parameter $\alpha$ (see definition in Background section). The lower is $\alpha$, the stronger is the heavy-tailed property. Performance improvement is observed with the presently disclosed SITA-V task assignment technique which comprises an improvement of approximately 2 over equal load balancing for $\alpha=1.1$. For $\alpha=0.5$, the improvement is approximately a factor of 33, when the system load is 50%.

When more than two hosts are employed, a number of task size cutoffs equal to the number of hosts -1 must be determined such that:

$$k=x_0<x_1<x_2<\ldots <X_{h-1}<X_h=p$$

All tasks between size $x_{i-1}$ and $x_i$ are assigned to host i.

Operating under SITA-V the cutoff points are preferably chosen to minimize $E\{S\}$ where:

$$E\{S\} = \sum_i^h p_i E\{S_i\}$$

The cutoff points in a SITA-V load balancing system having more than two hosts may in practice be assigned in any suitable manner. In a first approach for assigning successive cutoff points, a first lightly loaded host (host 1) is first assigned and a second virtual host with processing power equal to the remaining h-1 hosts is then assumed. This determines $x_1$, by now applying the algorithm for the 2-host case. The process is repeated recursively until the problem reduces to the two host case.

A second approach for the assignment of cutoff points in the SITA-V load balancing system is similar to the first, however, the heaviest loaded host is considered first.

A third approach finds the $x_i$ corresponding to the division of the system into two subsystems with (nearly) equal numbers of hosts. Starting from the lower bound $x_0=k$ and upper bound $X_h=p$, the cutoff point $X_{h/2}$ is determined. The first group of [h/2] hosts are assigned all tasks of size between $x_0$ and $x_{[h/2]}$ and the remaining hosts receive all tasks of size between $X_{[h/2]}$ and $X_h$. This process is repeated recursively within each of the two subsystems until the cutoff points defining the respective task size intervals for all host processors have been determined.

Figure 10:
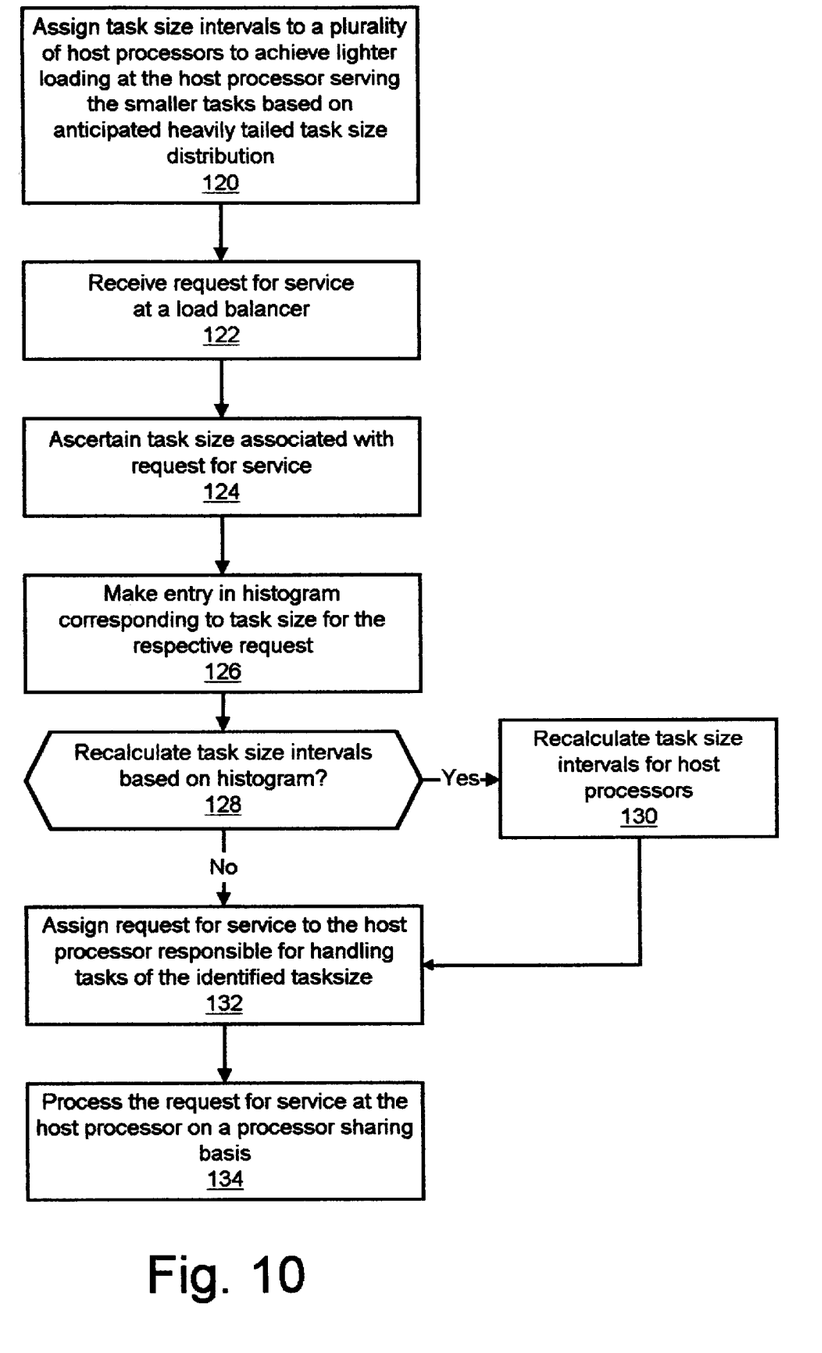
FIG. 10 is a flow diagram illustrating a second load balancing technique in accordance with the present invention.

The method of operation of the presently disclosed SITA-V method is further depicted in the flow diagram of FIG. 10. Referring to FIG. 10, task size intervals are first assigned to a plurality of host processors so as to achieve lighter loading at the host processor responsible for serving the smaller tasks as illustrated in step 120. Such assignments are made based upon the premise that the task sizes corresponding to the requests for service will be in the nature of a distribution possessing the heavy-tailed property. A request for service, such as an html request is next received at a load balancer as depicted in step 122. As shown in step 124, the load balancer ascertains the task size associated with the request for service such as by locating the file size for a requested file associated with an html request. As shown in step 126 an entry is made in a histogram to facilitate dynamic updating of task size interval assignments for the respective host processors. A determination is made in inquiry step 128 whether task size intervals are to be dynamically recomputed based upon the histogram data. If the task size intervals are not to be recomputed, as depicted in step 132, the request for service is assigned to the host processor responsible for handling tasks of the identified task size and the request for service is processed at the respective host processor on a processor sharing basis as illustrated in step 134. If, as a consequence of decision step 128 it is determined that the task size intervals are to be recalculated, the load processor recalculates the task size intervals as depicted in step 130 and subsequently dispatches requests for service based upon the recalculated task size intervals.

Though the preferred embodiment has been generally described in terms of the problems exhibited in a web server environment, it should be apparent that the presently described load balancing techniques are generally applicable in any distributed server environment where it is possible to ascertain or approximate a task's size.

It should be apparent to those of ordinary skill in the art that modifications to and variations of the above described load balancing methods and apparatus for use in a distributed server environment are possible without departing from the inventive concepts contained herein. Accordingly, the invention is not to be viewed as limited except as by the scope and spirit of the appended claims.

What is claimed is:

1. Load balancing apparatus for assigning for processing received requests for service, said load balancing apparatus comprising:
    a plurality of host processors for processing requests for service, wherein each of said host processors is operative to process requests for service within a predetermined task size interval;
    a request dispatch processor operative to receive a request for service and to ascertain, based upon such request, the task size of the respective request;
    said request dispatch processor operative to dispatch the request for service to one of said plurality of host processors for which the task size interval encompasses the task size for the respective request.

2. The load balancing apparatus of claim 1 wherein the predetermined task size intervals for the plurality of host processors are specified based upon an expected task size distribution.

3. The load balancing apparatus of claim 2 wherein the task size intervals for the respective host processors correspond to a unique portion of said expected task size distribution.

4. The load balancing apparatus of claim 2 wherein the task size intervals for the respective host processors are specified such that the sum of the task sizes corresponding to the requests expected to be served by each of the processors is approximately equal.

5. The load balancing apparatus of claim 2 wherein at least some of said plurality of host processors include at least one first come first serve queue and said at least some of said plurality of host processors are operative to queue requests for service in said at least one first come first serve queue upon receipt, and in advance of the processing of the respective requests.

6. The load balancing apparatus of claim 2 wherein at least some of said plurality of host processors are operative to queue requests for service in a time multiplexing manner upon receipt, in advance of the processing of the respective requests.

7. The load balancing apparatus of claim 2 wherein said request dispatch processor is further operative to dynamically reassign said task size intervals served by the respective host processors based upon historical task size data.

8. The load balancing apparatus of claim 2 wherein the requests for service comprise database queries, said host processors are operative to perform database queries in response to said requests for service, and said request dispatch processor is operative to determine the task size associated with said query.

9. The load balancing apparatus of claim 8 wherein said request dispatch processor is operative to determine the task size associated with said query based upon inspection of said query.

10. The load balancing apparatus of claim 2 wherein said request dispatch processor is operative to determine the task size associated with one of said requests for service based upon historical data pertaining to a similar request for service.

11. The load balancing apparatus of claim 2 wherein said request for service comprises a request to execute a program and said request dispatch processor is operative to determine the task size associated with the execution of the respective program.

12. The load balancing apparatus of claim 2 wherein said request dispatch processor comprises one of said plurality of host processors.

13. Load balancing apparatus for assigning tasks in response to requests for service appearing at said apparatus in the nature of a distribution of task sizes from small jobs to large jobs in which the small jobs comprise a majority of the requests for service and the large jobs comprise a minority of the requests for service, said apparatus comprising:
    a plurality of host processors for processing requests for service, wherein each of said host processors is operative to process requests for service corresponding to task sizes within a predetermined task size interval, wherein said task size intervals are specified for the respective host processors such that at least one of the host processors servicing its respective task size interval is more lightly loaded than host processors servicing requests corresponding to larger task sizes;
    a request dispatch processor operative to receive a request for service and to ascertain, based upon such request, the task size of the respective request;
    said request dispatch processor being further operative to dispatch the request for service to the respective one of said plurality of host processors assigned to service tasks of the task size for the respective request.

14. The load balancing apparatus of claim 1 wherein said distribution of task sizes approximates a heavily tailed distribution.

15. The load balancing apparatus of claim 13 wherein said request dispatch processor comprises one of said plurality of host processors.

16. A method for assigning a request for service to one of a plurality of host processors in response to the receipt of said request for service, comprising the steps of:
    assigning each host processor of said plurality of host processors to handle requests for service associated with task sizes within a specified task size interval;
    receiving a request for service;
    determining the task size associated with the respective request for service in response to receipt of the request for service;
    dispatching the request for service to the respective one of said plurality of host processors for which the task size associated with the request for service is within the task size interval serviced by the respective host processors.

17. The method of claim 16 wherein said assigning step comprises the step of assigning each one of said plurality of host processors to handle requests for service associated with task sizes within said specified task size interval based upon an expected task size distribution.

18. The method of claim 17 wherein said assigning step further comprises the step of assigning each one of said plurality of host processors to handle requests for service associated with task sizes within a unique task size interval.

19. The method of claim 17 wherein said assigning step further comprises the step of assigning task size intervals to the respective host processors such that the sum of the task sizes expected to be served by each of the processors is approximately equal.

20. The method of claim 17 wherein at least some of said plurality of host processors include a first come first serve queue and said dispatching step further comprises the step of dispatching the request for service to the first come first serve queue in the respective host processor.

21. The method of claim 16 further comprising the step of processing the request for service at the respective host processor in a time multiplexing manner in the event no more than a predetermined number of requests for service have been dispatched to the respective host processor and remain unserviced.

22. The method of claim 16 further including the step of dynamically reassigning said task size intervals served by the respective host processors based upon historical task size data.

23. The method of claim 16 wherein said receiving step comprises the step of receiving a hypertext transport protocol request.

24. The method of claim 16 wherein said receiving step comprises the step of receiving a request to perform a database query, said determining step comprises the step of determining the task size associated with the database query and said dispatching step comprises the step of dispatching the database query to the respective one of said plurality of host processors based upon the task size for the respective query.

25. The method of claim 24 wherein said step of determining the task size of said query comprises the step of inspecting the database query to ascertain the task size associated with the respective query.

26. The method of claim 16 wherein said determining step comprises the step of determining the task size associated with the respective request for service based upon historical task size data.

27. The method of claim 26 wherein said step of determining the task size associated with the database query further comprises the step of assigning a task size to the respective request in the event historical task size data is unavailable, said dispatching step further comprises the step of dispatching the request for service to one of said plurality of host processors based upon the assigned task size for the respective request and said method further includes the step of generating and storing historical data pertaining to the respective request following the servicing of the request at the respective host processor.

28. The method of claim 16 wherein said dispatching step comprises the step of dispatching said request for service to at least one processor comprising the respective host processor in a distributed computing system.

29. The method of claim 16 wherein said receiving step comprises the step of receiving a request to execute a program and said determining step comprises the step of determining the task size associated with the execution of said program.

30. The method of claim 16 wherein said determining step comprises the step of performing at least one table lookup to determine the task size associated with the respective request for service.

31. The method of claim 16 wherein the request for service includes task size information indicative of the task size for the respective request and said determining step comprises the step of determining the task size for the request based upon said task size information contained within the request for service.

32. A method for assigning requests for service received at distributed server system to one of a plurality of host processors for service, wherein the nature of the received requests for service correspond to task sizes in the nature of a distribution of job task sizes from small jobs to large jobs in which the small jobs comprise a majority of the requests for service and the large jobs comprise a minority of the requests for service, said method comprising:

assigning each host processor of said plurality of host processors to handle requests for service associated with task sizes within predetermined task size intervals such that at least one of the host processors is more lightly loaded than the host processors servicing requests for service involving larger task sizes;

receiving said request for service;

determining the task size associated with the respective request for service;

dispatching the request for service to the respective one of said plurality of host processors for which the task size associated with the request for service is within the respective host processors assigned task size interval.

33. The method of claim 32 wherein said assigning step further comprises the step of assigning said the one of said plurality of host processors which is more lightly loaded to service the smallest jobs within said distribution of job task sizes.

34. The method of claim 32 wherein said assigning step further comprises the step of assigning the task size intervals to respective host processors such that at least some of the task size intervals comprise unique task size intervals.

35. The load balancing apparatus of claim 1 wherein each of said host processors is operative in one of a plurality of service order modes and the service order mode for each of said host processors is specified based upon a predetermined criterion.

36. The load balancing apparatus of claim 35 wherein said predetermined criterion comprises the variance in the task size distribution of the tasks arriving at the respective host processor.

37. The load balancing apparatus of claim 1 wherein said requests for service comprise hypertext transport protocol requests.

38. A method for assigning a request for service to one of a plurality of host processors in response to the receipt of said request for service, comprising the steps of:

receiving a request for service communicated via the Internet;

determining the task size associated with the respective request for service in response to receipt of the request for service; and dispatching the request for service to the respective one of said plurality of host processors in response to the determined task size associated with the request for service.

39. The load balancing apparatus of claim 1 wherein said request dispatch processor is operative to dispatch a predetermined percentage of the requests for service to one of said plurality of host processors for which the task size interval encompasses the task size for the respective request.

* * * * *